United States Patent
Claasen et al.

(10) Patent No.: US 9,796,154 B2
(45) Date of Patent: Oct. 24, 2017

(54) FILMLESS BACKSHEETS WITH GOOD BARRIER PROPERTIES

(71) Applicants: Gert Claasen, Richterswil (CH); Jill M. Martin, Pearland, TX (US)

(72) Inventors: Gert Claasen, Richterswil (CH); Jill M. Martin, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 327 days.

(21) Appl. No.: 14/062,962

(22) Filed: Oct. 25, 2013

(65) Prior Publication Data

US 2015/0114546 A1    Apr. 30, 2015

(51) Int. Cl.

| | | |
|---|---|---|
| *B32B 5/26* | (2006.01) | |
| *B32B 27/00* | (2006.01) | |
| *B32B 37/00* | (2006.01) | |
| *B32B 3/00* | (2006.01) | |
| *B32B 5/02* | (2006.01) | |
| *B32B 27/08* | (2006.01) | |
| *B32B 27/32* | (2006.01) | |
| *B32B 37/04* | (2006.01) | |
| *D04H 3/16* | (2006.01) | |
| *D04H 5/06* | (2006.01) | |
| *B32B 5/08* | (2006.01) | |
| *B32B 37/06* | (2006.01) | |

(52) U.S. Cl.
CPC .............. *B32B 5/26* (2013.01); *B32B 5/022* (2013.01); *B32B 5/08* (2013.01); *B32B 27/08* (2013.01); *B32B 27/32* (2013.01); *B32B 37/04* (2013.01); *D04H 3/16* (2013.01); *D04H 5/06* (2013.01); *B32B 37/0053* (2013.01); *B32B 37/0076* (2013.01); *B32B 37/06* (2013.01); *B32B 2262/0253* (2013.01); *B32B 2262/0276* (2013.01); *B32B 2262/12* (2013.01); *B32B 2305/20* (2013.01); *B32B 2307/718* (2013.01); *B32B 2307/7246* (2013.01); *B32B 2309/02* (2013.01); *B32B 2419/06* (2013.01); *B32B 2555/00* (2013.01); *Y10T 442/66* (2015.04)

(58) Field of Classification Search
CPC .. B32B 5/26; B32B 5/08; B32B 27/08; B32B 27/32; B32B 37/04; B32B 3/16; B32B 37/00; D04H 5/06
See application file for complete search history.

(56) References Cited

U.S. PATENT DOCUMENTS

| | | | |
|---|---|---|---|
| 4,600,614 A | | 7/1986 | Lancaster et al. |
| 5,188,885 A | * | 2/1993 | Timmons ................. B32B 5/26 |
| | | | 128/849 |
| 5,194,190 A | | 3/1993 | Kim |
| 5,393,599 A | * | 2/1995 | Quantrille ............... B32B 5/26 |
| | | | 156/163 |
| 5,470,639 A | | 11/1995 | Gessner et al. |
| 5,484,645 A | * | 1/1996 | Lickfield ................. B32B 5/26 |
| | | | 128/849 |
| 5,679,042 A | | 10/1997 | Varona |
| 5,855,992 A | | 1/1999 | Etzold |
| 5,918,140 A | | 6/1999 | Wickboldt et al. |
| 6,176,952 B1 | | 1/2001 | Maugans et al. |
| 8,308,833 B2 | | 11/2012 | Takano et al. |

FOREIGN PATENT DOCUMENTS

| | | |
|---|---|---|
| EP | 0534863 A1 | 3/1993 |
| EP | 1977884 A1 | 10/2008 |
| GB | 2496244 A | 5/2013 |
| JP | 11117164 | 4/1999 |
| WO | 9306168 A1 | 4/1993 |
| WO | 95/32091 A1 | 11/1995 |
| WO | 9730244 A2 | 8/1997 |
| WO | 2007070688 A1 | 6/2007 |

OTHER PUBLICATIONS

Partial International Search Report for PCT/US2014/061724, Mar. 18, 2015, pp. 1-2.

* cited by examiner

*Primary Examiner* — Michael N Orlando
*Assistant Examiner* — Matthew Hoover

(57) ABSTRACT

A multilayer nonwoven structure is described where the nonwoven structure comprises at least two spun bond layers and at least one easily meltable layer. The easily meltable layer is located between the at least two spunbond layers. The easily meltable layer is comprised of a polymer having a melting point at least 20° C. less than the melting point of the polymer which comprises the surface of the fibers which comprise the spun bond layer, or is made from a polymer which is readily absorbs some form of radiation. Under bonding conditions, the fibers which make up the easily meltable layer can be melted to form a film, thereby improving bather properties of the nonwoven structure.

7 Claims, No Drawings

FILMLESS BACKSHEETS WITH GOOD BARRIER PROPERTIES

FIELD OF THE INVENTION

A multilayer nonwoven structure comprising a first spun bond layer, a second spun bond layer and at least one easily meltable layer located between the first and second spun bond layers, which may be, for example, a meltblown layer, a spunbond layer or even a carded staple fiber layer. The easily meltable layer is comprised of fibers having a maximum cross section of 5 microns or less, and comprised of a polymer which has a melting point which is at least 20° C. less than the melting point of the polymer comprising the outer surface of the fibers used in the first and second spunbond layer. The easily meltable layer(s) is capable of melting during a bonding process such that it can be converted to a film-like morphology.

BACKGROUND AND SUMMARY OF THE INVENTION

Today acceptable barrier properties in textile and nonwovens have been generally achieved by laminating breathable or non-breathable film to a nonwoven or textile. Eliminating such a lamination process while maintaining the desired transport and barrier properties is sought so that costs can be reduced while maintaining the textile touch.

In the past few years there has been a significant development in Spunbond technology driven by machine manufacturers in order to cut cost in the hygiene market for producing spunbond nonwovens. Due to the ever increasing rates of production, machines are currently been installed with up to 6 beams with 7 beam machines as the next generation. These machines typically have Spunbond and Meltblown beams in combination.

Therefore, when looking to replace the lamination step for combining films with the nonwoven, it was decided to produce a structure inline utilizing the newer multibeam technology and include a low melting polymer in the one or more of the interior layers of a $SX_nMX_nS$ where n can be 0 to 3 (where S indicates a spunbond layer, M indicates a melt blown layer and X may be either a spun bond or a melt blown layer, and n can be 0 to 3). It was thought that exposing such lower melting melt blown fibers to the pressure and temperatures typically encountered during the bonding stage of the spunbond nonwoven process, a film-like structure could be formed, such that the breathability and barrier properties of such a structure could be tailored to the application.

Accordingly the present invention relates to a multilayer nonwoven structure comprising at least two spun bond layers and at least one easily meltable layer wherein the easily meltable layer is located between the at least two spunbond layers, and where the easily meltable layer is comprised of a polymer having a melting point less than the melting point of the polymer which comprises the outer surface of the fibers which comprise the meltblown or spun bond layers which are not intended to be melted.

The present invention allows a more textile-like article with the same containment as a film-nonwoven laminate to be produced, but with better haptics, equivalent breathability, and lower manufacturing costs.

DETAILED DESCRIPTION

As used herein, the term "nonwoven web" or "nonwoven fabric" or "nonwoven", refers to a web that has a structure of individual fibers or threads which are interlaid, but not in any regular, repeating manner. Nonwoven webs have been, in the past, formed by a variety of processes, such as, for example, air laying processes, meltblowing processes, spunbonding processes and carding processes, including bonded carded web processes.

As used herein, the term "meltblown", refers to the process of extruding a molten thermoplastic material through a plurality of fine, usually circular, die capillaries as molten threads or filaments into a high velocity gas (e.g., air) stream which attenuates the filaments of molten thermoplastic material to reduce their diameter, which may be to a microfiber diameter. Thereafter, the meltblown fibers are carried by the high velocity gas stream and are deposited on a collecting surface to form a web of randomly dispersed meltblown fibers.

As used herein, the term "spunbonded", refers to the process of extruding a molten thermoplastic material as filaments from a plurality of fine, usually circular, capillaries of a spinneret with the diameter of the extruded filaments then being rapidly reduced by drawing the fibers and collecting the fibers on a substrate.

As used herein, the term "microfibers", refers to small diameter fibers having an average diameter not greater than about 100 microns. Fibers, and in particular, spunbond and meltblown fibers used in the present invention can be microfibers. More specifically, the spunbond fibers can advantageously be fibers having an average diameter of about 15-30 microns, and having a denier from about 1.5-3.0 denier per filament, whereas the meltblown fibers can advantageously be fibers having an average diameter of less than about 15 microns, or more advantageously 10, 8 or even 5 microns.

As used herein, the term "polymer" generally includes, but is not limited to, homopolymers, copolymers, such as, for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "polypropylene based plastomers (PBP) or elastomers (PBE)" (collectively, these may be referred to as "PBPE") includes reactor grade copolymers of propylene having heat of fusion less than about 100 Joules/gm and MWD<3.5. The PBPs generally have a heat of fusion less than about 100 Joules/gram while the PBEs generally have a heat of fusion less than about 40 Joules/gram. The PBPs typically have a weight percent ethylene in the range of about 3 to about 10 wt % ethylene, with the elastomeric PBEs having an ethylene content of from about 10 to 15 wt % ethylene.

The nonwoven layered structure of the present invention will preferably have a basis weight (weight per unit area) from about 10 grams per square meter (gsm) to about to about 200 gsm. The basis weight can also be from about 15 gsm to about 60 gsm, and in one embodiment it can be about 20 to 35 gsm which is particularly suited for hygiene applications. For medical applications, the preferred basis weight may be 50 to 100 gsm, or for industrial applications may be 80 to 5000 gsm.

As used herein, the term "tensile strength" describes the peak force for a given basis weight when pulled in either the machine direction (MD) or cross direction (CD) of a nonwoven when pulled to break. The peak force may or may not correspond to the force at break or strain at break. "Elongation" unless otherwise specified, refers to the strain corresponding to the tensile strength.

"Melting point" is determined according to ASTM D3418, "Standard Test Method for Transition Temperatures and Enthalpies of Fusion and Crystallization of Polymers by Differential Scanning calorimetry".

"Water Vapor Transmission Rate" (WVTR) sometimes referred to as "Moisture Vapor Transmission Rate" (MVTR) is determined according to Edana test method WSP070.6.R3 (12).)

The present invention relates to a multilayer nonwoven structure comprising at least two spun bond layers and at least one easily meltable layer wherein the easily meltable layer(s) is located between the at least two spunbond layers. The easily meltable layer can be a meltblown layer, a spunbond layer or even a carded staple fiber layer. The easily meltable layer is comprised of a polymer having a melting point less than the melting point of the polymer which comprises the surface of the fibers which comprise the spun bond layer.

The spunbond layers used for the outer layers in the multilayer nonwoven structures can be bicomponent fibers or monocomponent fibers. If bicomponent fibers are used, it is preferred that the fibers be in the sheath-core format. The fibers can be made from any polymer. Preferred monocomponent fibers include homopolymer polypropylene (hPP) random copolymer polypropylene or polyethylene (PE), Bicomponent fibers include hPP/PE, RCP/PE, polyolefin elastomer/PE or hPP/hPP, polyethylene terephthalate (PET)/X or polyamide (PA)/X bicomponent where X can be any polyolefin or any elastic nonwoven spunbond or PLA. The fibers should be chosen to ensure that the polymer at the surface of the fibers (for example, the sheath in a bicomponent sheath-core fiber) has a melting point which is higher than the polymer used for the film-forming meltblown fiber layer. Preferably the polymer used at the surface of the spunbond fiber has a melting point which is at least 20° C., 30° C. or even 40° C. higher than that of the polymer used in the easily meltable layer. Preferably the polymer used in the surface of the fibers used in the outer spunbond layer has a melting point which is greater than 125° C., or greater than 140 degrees or even 160° C.

The easily meltable layers used for the mandatory inner layer in the multilayer nonwoven structures can be meltblown layers, spunbond layers or carded staple fibers, although for many applications meltblown layer(s) may be preferred. The fibers used in the easily meltable layer may be based on hPP, PE, polyolefin (PO) Elastomers, PET, PA, or other polar copolymers such as ethylene vinyl acetate (EVA), ethylene carbon monoxide (ECO, ethylene acrylic acid (EAA), maleic anhydride grafted copolymer, ethylene methacrylic acid (EMA) (which may be radio frequency (RF) or microwave active). PO Elastomers include propylene based plastomers or elastomers (PBPE) such as VERSIFY™ elastomers sold by the Dow Chemical Company or VISTAMAXX™ elastomers sold by ExxonMobil, and olefin block copolymers such as INFUSE™ elastomers sold by the Dow Chemical Company. Polyethylene fibers include linear low density polyethylene (LLDPE), high pressure low density polyethylene (LDPE), high density polyethylene (HDPE) and the like. Preferred polyethylene fibers include plastomeric or elastomeric LLDPE (i.e. LLDPE having densities of about 0.910 g/cm$^3$ or less). These materials may be used alone or in blends with two or more of such components. For ease of melting, the materials preferably have a melting point which is at least 20° C., 30° C. or even 40° C. less than that of the polymer used in the surface of the fibers which make up the outer spunbond layers. Preferably the polymer used in the at least one easily meltable layer has a melting point of 100° C. or less than 90 degrees. Alternatively if the easily meltable layers are RF, microwave or ultrasonic active, while the spunbond layers are not, radio, ultrasonic or microwave radiation could be used to melt the inner easily meltable layer while leaving the outer spunbond layers fibrous. Especially preferred materials for the fibers in the easily meltable layer(s) of the present invention include the propylene based elastomers. If more than one meltblown layer is used then the melt-blown layers may be similar or different in composition such that the lower-melting polymer may be any one of the layers depending upon the overall bather, permeability, or strength desired.

The multilayer nonwoven structures of the present invention comprise two outer spunbond layers and at least one inner easily meltable layer, but may contain additional layers. In general the multilayer structures can be described as $SX_nMX_nS$ where S is a spunbond layer, M is a meltblown layer, X is either a spunbond or meltblown layer and n can be 0 to 3.

It is generally preferred that the nonwoven structure have relatively high stiffness/strength to support the structure as the easily meltable layer is melted. This can be done, for example, by using additional layers made with stiffer materials such as hPP and/or using polymer which is generally stiffer for the easily meltable layers, such as a PBPE with a lower ethylene content, for example 5-7%.

After the layers are brought together, they are typically subjected to pressure and/or higher temperatures to facilitate the bonding of such structures. These higher temperatures and pressures can be chosen so as to melt at least one of the inner layers. Once the pressure and/or heat is removed, as the polymer is generally confined between adjacent layers, it will solidify to form a film-like structure, which can help reduce the water vapor transmission of the nonwoven structure. Alternatively, rather than relying on heat and/or pressure to cause the inner layer to melt, if radio or microwave active materials are used, the nonwoven structure can be subjected to radio or microwave radiation to cause the melting. It is thought that the inner layers can be varied according to melting point and thicknesses so that the breathability and barrier properties of such a structure can be tailored to the application. Thus, the nonwoven structures of the present invention can be used for health and hygiene articles such as baby diaper backsheets, adult incontinence backsheets, feminine hygiene backsheets, surgical gowns, medical drapes, and plasters or bandages. The nonwoven structures could also be used for industrial applications such as roofing membranes, geo-membranes, housewrap, or upholstery.

EXAMPLES

In order to demonstrate the present invention two separate series of nonwoven structures were prepared as indicated below. The first set of trials is produced by combining the different layers of nonwoven together as indicated below and then bonding the layers together to form a laminate. The bonding is accomplished by using two heated rollers, one being smooth and the other having a bond area of 16%. The bonding is done at a pressure of 70 N.mm, a calender oil bonding temperature set at 145° C. and a line speed of 25 m/min.

The second set of trials is produced by combining the different layers of nonwoven together as indicated below and then bonding the layers together to form a laminate.

These structures are first bonded as is done for the first set of trials (i.e. at a calender oil bonding temperature of 145° C., with one smooth roller and another with a 16% bond area, at a pressure of 70 N.mm and a line speed of 25 m/min) These structures are then bonded a second time at temperatures of 95° C. and 30 bar bip pressure @25 m/min using a 100% bond area roll. As seen below, hydrohead is much improved using the 100% bond area, suggesting that the easily meltable layer is not fully melted under the first set of conditions.

First Trials Combining Nonwoven Layers and Materials:

Example 1: Layer A/Layer C/Layer G/Layer G/Layer C/Layer A (50 FPM)
Example 2: Layer A/Layer C/Layer G/Layer G/Layer C/Layer A (34 FPM)
Example 3: Layer A/Layer G/Layer G/Layer A (24 FPM)
Example 4: Layer A/Layer C/Layer B/Layer C/Layer A
Example 5: Layer A/Layer C/Layer B/Layer B/Layer C/Layer A
Example 6: Layer A/Layer C/Layer D/Layer C/Layer A
Example 7: Layer A/Layer C/Layer E/Layer C/Layer A
Example 8: Layer A/Layer C/Layer E/Layer C/Layer A Second Trials Combining Nonwoven Layers and Materials:

Example 9 (comparative): SMS—Layer A/Layer C/Layer A
Example 10: SMS—Layer A/Layer B/Layer A
Example 11: SMS—Layer A/Layer E/Layer A
Example 12: SMMMS Layer A/Layer C/Layer B/Layer C/Layer A
Example 13: SMMMS Layer A/Layer C/Layer B/Layer C/Layer A
Example 14: SMMMS Layer A/Layer B/Layer B/Layer C/Layer A
Example 15: SMMMS Layer A/Layer B/Layer E/Layer C/Layer A
Example 16: SMMMS Layer A/Layer B/Layer E/Layer B/Layer A
Example 17: SMMMS Layer A/Layer C/Layer D/Layer C/Layer A Description of the Layers Layer A is a 20 gram per square meter (GSM) basis weight spunbond nonwoven produced on a Reicofil spunbond technology made from a homopolymer polypropylene (hPP) with an MFR (2.16 Kg, 230° C.) of 25 g/10 min and a melting point of 167° C.

Layer B is a 25 GSM basis weight meltblown nonwoven produced on a Reicofil meltblown technology made from a Propylene based Plastomer/Elastomer (PBPE) with a MFR 25 g/10 min, having an ethylene content of 5% and a melting point of 110° C. and adding 2% Irgatec CR76 masterbatch.

Layer C is a 25 GSM basis weight meltblown nonwoven produced on a Reicofil meltblown technology made homopolymer polypropylene (hPP) with a MFR of ~800 g/10 min and a melting point of 167° C.

Layer D is a 25GSM basis weight meltblown nonwoven produced on a Reicofil meltblown technology made from a gas-phase-reactor-produced linear low density polyethylene (LLDPE) having a MI (2.16 Kg, 190° C.) of 155 g/10 min and density of 0.933 g/cm$^3$ and having a melting point of 120° C.

Layer E is a 25 GSM meltblown nonwoven produced on a Reicofil meltblown technology with a Propylene based Plastomer/Elastomer (PBPE) with a MFR between 25 g/10 min, having an ethylene content of 9% and a melting point of 85° C. and adding 2% Irgatec CR76 masterbatch.

Layer G is a 10 GSM (50 feet/min) or 15 GSM (34 feet/min) or 20 GSM (24 feet/min) (as indicated above) meltblown nonwoven produced on a BIAX Film with Propylene based Plastomer/Elastomer (PBE1) with a MFR 25 g/10 min, having an ethylene content of 5% and a melting point of 110° C. and adding 2% Irgatec CR76 masterbach.

Spunbond samples were produced on a Reicofil 3 single beam technology which have is 1.2 meter wide spunbond pilot line with 5000 holes per meter and where the holes are 0.6 mm in diameter and have an L/D ratio of 4. Throughput of the line was constant at 0.6 ghm with a line speed of 150 m/min.

Meltblown samples Layer G were produced on a Biax Fiberfilm line with a 15 cm (6 in) wide die with 128 holes. The fibers were attenuated using hot air and collected on a fiber drum at different speeds in order to vary the basis weight and were deposited directly on the nonwoven layer Meltblown samples B, C, D and E were produced on a Reicofil/Hills technology meltblown line with a width of 1.2 meters wide and 50 holes per inch. The hole diameter has been 0.25 mm. The meltblown nonwovens were produced at 20 meters/min line speed focusing on producing a 25 GSM nonwovens.

The following analyses were completed:
Hydrohead (measured in cm via ISO)
WVTR (measured in g/m2/day at 38° C. and 90% relative humidity using ISO)
Basis weight, measured in grams/m$^2$ (gsm)

First Trials Combining Nonwoven Layers and Materials:

| Sample | WVTR (g/m$^2$/day) | Hydrohead (Millibar) |
|---|---|---|
| Example 1 | 5550 | 25 |
| Example 2 | 5017 | 20 |
| Example 3 | 5022 | 17 |
| Example 4 | 4909 | 11 |
| Example 5 | 4880 | 11 |
| Example 6 | 5242 | 12 |
| Example 7 | 5293 | 15 |
| Example 8 | 5483 | 13 |

Second Trials Combining Nonwoven Layers and Materials:

| Sample | Hydrohead (Millibar) |
|---|---|
| Example 9 (comparative) | 97 |
| Example 10 | 269 |
| Example 11 | 16 |
| Example 12 | 110 |
| Example 13 | 309 |
| Example 14 | 305 |
| Example 15 | 101 |
| Example 16 | 121 |
| Example 17 | 135 |

What is claimed is:

1. A multilayer nonwoven structure comprising at least two spun bond layers and at least one easily meltable layer wherein the easily meltable layer is located between the at least two spunbond layers, and where the easily meltable layer is comprised of fibers comprising a polyolefin elastomer polymer having a melting point at least 20° C. less than the melting point of the polymer which comprises the surface of the fibers which comprise the spun bond layer.

2. A multilayer nonwoven structure comprising:
a. a first spun bond outer layer comprising monocomponent or bicomponent fibers wherein the fibers have a surface which is comprised of a polyolefin polymer having a given melting point;
b. an easily meltable layer wherein the easily meltable layer is comprised of fibers having a maximum cross section of 5 microns or less, and comprised of a polyolefin elastomer polymer which has a melting point which is at least 20° C. less than the melting point of the polymer comprising the surface of the fibers used in the first and second spunbond outer layers;
c. a second spunbond outer layer comprising monocomponent or bicomponent fibers wherein the fibers have a surface which is comprised of a polyolefin polymer having a given melting point;
  wherein the easily meltable layer is located between the first spunbond layer and the second spunbond layer; and
  wherein the easily meltable layer is capable of melting during a bonding process such that it can be converted to a film-like morphology.

3. The multilayer nonwoven of claim 1 wherein heat and pressure is applied to the multilayer nonwoven structure causing the fibers in the easily meltable layer to at least partially melt thereby increasing the barrier properties of the easily meltable layer.

4. The multilayer nonwoven structure of claim 2 wherein the polyolefin elastomer polymer which makes up the fibers of the easily meltable layer has a melting point which is less than 125° C.

5. The multilayer nonwoven structure of claim 2 wherein the polymer which makes up the fibers of the outer spunbond layer has a melting point which is greater than 125° C.

6. The multilayer nonwoven structure of claim 2 wherein the easily meltable layer is comprised of a polyolefin elastomer polymer which has a melting point which is at least 40° C. less than the melting point of the polymer comprising the surface of the fibers used in the first and second spunbond outer layers.

7. A multilayer nonwoven structure comprising:
a. a first spun bond outer layer comprising monocomponent or bicomponent fibers wherein the fibers have a surface which is comprised of a polyolefin polymer having a given melting point;
b. an easily meltable layer wherein the easily meltable layer is comprised of fibers having a maximum cross section of 5 microns or less, and comprised of a polyolefin elastomer polymer which absorbs RF radiation or ultrasonic radiation to a much greater extent than the polymer used in the outer layers;
c. a second spunbond outer layer comprising monocomponent or bicomponent fibers wherein the fibers have a surface which is comprised of a polyolefin polymer having a given melting point;
  wherein the easily meltable layer is located between the first spunbond layer and the second spunbond layer; and
  wherein the easily meltable layer is capable of melting during a bonding process such that it can be converted to a film-like morphology.

* * * * *